United States Patent Office 3,598,790
Patented Aug. 10, 1971

3,598,790
AZLACTONE COPOLYMERS
Fritz Kollinsky, Darmstadt-Eberstadt, and Klaus Hubner and Gerhard Markert, Ober Ramstadt-Eiche, Germany, assignors to Rohm & Haas G.m.b.H., Darmstadt, Germany
No Drawing. Continuation-in-part of applications Ser. No. 650,260, June 30, 1967, now Patent No. 3,488,327, and Ser. No. 779,651, Nov. 27, 1968, the latter being a continuation-in-part of application Ser. No. 650,238, June 30, 1967. This application Jan. 5, 1970, Ser. No. 791
Claims priority, application Germany, July 1, 1966, R 43,605; Dec. 1, 1967, P 17 45 348.4
The portion of the term of the patent subsequent to Jan. 6, 1970, has been disclaimed
Int. Cl. C08f *19/00;* C08g *17/02*
U.S. Cl. 260—78.3          16 Claims

ABSTRACT OF THE DISCLOSURE

Copolymers of (A) an azlactone

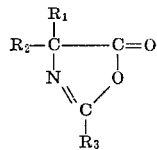

having a copolymerisable ethylenically unsaturated group $R_3$, (B) a copolymerisable vinylidene compound having at least one free alcoholic hydroxy group therein, and (C) one or more olefinically unsaturated monomers distinct from and copolymerizable with (A) and (B), as well as coatings prepared by cross-linking such copolymers at room temperatures or up to 80° C.

---

This application is a continuation-in-part of our co-pending applications Ser. No. 650,260 filed June 30, 1967 (now U.S. Pat. 3,488,327 granted Jan. 6, 1970), and Ser. No. 779,651 filed Nov. 27, 1968, which in turn is a continuation-in-part of our earlier application Ser. No. 650,238 filed June 30, 1967 (now abandoned).

The present invention relates to solvent-soluble, film-forming, solid azlactone copolymers capable of cross-linking in the absence of an external cross-linking agent, useful as coating materials, to methods of making the same, to methods of cross-linking said copolymers, and to cross-linked products.

It is known in the art to coat substrate materials such as metal, wood, paper, cardboard, leather, or textiles with a solution or dispersion of film-forming plastics, or to use these as surface paints, and then subsequently to impart desired properties such as insolubility, increased surface hardness, and improved mechanical strength to the resulting coating by way of a cross-linking or hardening reaction. Exemplary of such cross-linking mechanisms is the cross-linking of vinyl copolymers consisting principally of acrylic acid esters or methacrylic acid esters, which copolymers are unexcelled from the viewpoint of lack of color and resistance to weathering. These copolymers, partially comprising methylol compounds, or capped methylol compounds such as methylol ethers, of acrylamide or methacrylamide are cross-linked by heating, optionally under the additional influence of catalysts. If uneconomically long hardening times are to be avoided, temperatures of 120° C.–180° C. must be used for the cross-linking.

The incorporation into vinyl polymers of other highly reactive groups capable of cross-linking is precluded either by the limited accessibility of the corresponding vinyl monomers in technical amounts or by the necessity for energetic conditions for cross-linking. A cross-linking mechanism for vinyl polymers which succeeds using technically accessible highly reactive monomers and which brings about cross-linking under mild reaction conditions is not yet known.

The present invention relates to copolymers soluble in common volatile organic solvents, such as ethyl acetate, acetone, chloroform, or toluene, which copolymers are film-forming at room temperature or slightly elevated temperature, and which cross-link at room temperature or on gentle heating to about 80° C., optionally in the presence of an acid or alkaline catalyst, useful as coating materials and providing valuable films when cross-linked. The copolymers according to the invention consist essentially of (A) 0.5 to 30 percent of an azlactone of the formula

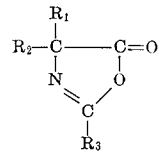

wherein $R_1$ and $R_2$ taken alone are alkyl or cycloalkyl but at least one of $R_1$ and $R_2$ is alkyl, or wherein $R_1$ and $R_2$ taken together with the carbon atom to which they are joined form a carbocyclic ring, and $R_3$ is vinyl, isopropenyl, acryloxyalkyl, methacryloxyalkyl, acrylamidoalkyl, or methacrylamidoalkyl; (B) 0.5 to 49.5 percent of a polymerizable vinylidene compound having at least one free alcoholic hydroxy group, and (C) 20.5 to 99 percent of one or more olefinically unsaturated monomers copolymerizable with (A) and (B), all percentages being by weight of all copolymerized monomers.

The copolymers are prepared in bulk, or by emulsion or solution polymerisation, at temperatures from 0° C. to 200° C., preferably of from 20° C. to 80° C., in the presence of a free-radical initiator. Suitable initiators include azo compounds such as azo-bis(isobutyronitrile) and per compounds such as the peroxides (e.g. lauryl peroxide) and peracids. The preferred method of making the azlactone copolymers is by solution polymerisation, ethyl acetate, butyl acetate, ethyl glycol acetate, acetone, methyl isobutyl ketone, benzene, toluene, the xylenes being examples for suitable solvents.

The following azlactones (or oxazolones) are exemplary of those which may be used as component (A) of the copolymer according to the invention:

2-isopropenyl-4,4-dimethyl-oxazolone;
2-isopropenyl-4-methyl-4-propyl-oxazolone;
2-isopropenyl-4,4-dipropyl-oxazolone;
2-vinyl-4-methyl-4-benzyl-oxazolone;
2-acryloxethyl-4-methyl-4-cyclohexyl-oxazolone;
2-vinyl-4-methyl-4-phenyl-oxazolone;
2-(2′-N-methacrylamido-isopropyl)-4,4-dimethyl-oxazolone;
cyclohexane-spiro-4-(2-isopropenyl-oxazolone); and
tetrahydropyran-4-spiro-4′-(2′-vinyl-oxazolone).

Azlactones can be considered to be anhydrides of α-acylamino acids and can be prepared from these acids by the removal of water, for example using acetic acid anhydride ("Organic Reactions," vol. 3, 1949, pages 198 et seq.). As exemplary of the preparation of a polymerizable azlactone, the reaction of α-amino isobutyric acid with methacrylic acid chloride, with subsequent ring closure, is shown below:

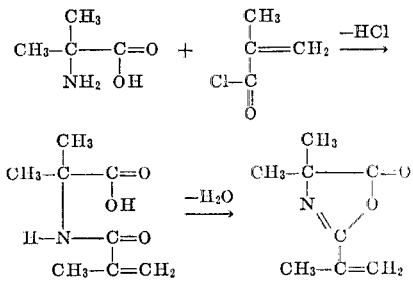

On copolymerization according to the present invention, an azlactone molecule is incorporated into the main chain of the macromolecule by way of the unsaturated polymerizable group shown earlier as $R_3$ in the general formula for the azlactone. On copolymerization, macromolecules are formed which carry both azlactone groups and hydroxy groups. By reaction of the azlactone group off a first macromolecule with the hydroxy group of a second macromolecule, ring opening occurs according to the following reaction together with a bonding of two macromolecules:

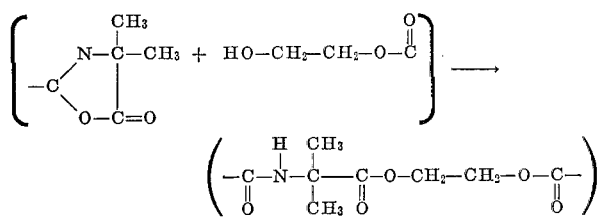

Since the bonding shown above occurs at several sites on every macromolecule, cross-linking occurs.

The azlactone may carry any unsaturated polymerizable group $R_3$ instead of the isopropenyl group shown in the formulas above, for example vinyl, acryloxyalkyl, methacryloxyalkyl, acrylamidoalkyl, or methacrylamidoalkyl. Azlactones which contain the above-mentioned unsaturated groups are easily prepared from an amino acid and from the chloride of an unsaturated acid containing the corresponding radical $R_3$, just as for the isopropenyl derivative. Although in principle all α-amino carboxylic acids can be used for the preparation of polymerizable azlactones, those azlactones prepared from α,α-di-substituted glycines, advantageously those prepared from α,α-dialkyl glycines, and specifically those prepared from α,α-dimethyl glycine, are preferred. On the one hand, these compounds are sufficiently stable to be simply prepared with good yields. On the other hand, they copolymerize well with other monomers and nevertheless promote easy and complete cross-linking upon reaction with bi-functional or polyfunctional compounds. It must be considered suprising that azlactones derived from a dialkyl glycine, particularly from dimethyl glycine, are easily obtainable stable monomers which readily copolymerize, and yet that the 5-membered ring incorporated into such a copolymer will open easily in the presence of an hydroxy group to permit bond formation by way of addition according to the exemplary formulas given earlier. The utility of such dialkylated azlactones in carrying out the process according to the invention is increased by the fact that they are easily prepared on a large scale from cheap starting materials.

As the copolymerizable azlactone-reactive hydroxylic component (B), hydroxy compounds having a vinylidene ($CH_2=C=$) group therein are particularly useful. Such monomers include the acrylate methacrylate, or itaconate monoesters of dihydroxy and polyhydroxy compounds as well as the acrylamides and methacrylamides of hydroxyamines, such as the monoacrylate and monomethacrylates of ethylene glycols, glycerine, pentaerythritol, and butane diol, and the acrylic and methacrylic acid amides of ethanolamine. Further useful monomers of this type are 4-hydroxymethyl-styrene and 4-(2-hydroxythoxymethyl)-styrene. The surprisingly easy cross-linking of the coating materials according to the present invention at ordinary temperatures or on slight warming, and/or addition of a catalyst such as phosphoric acid or a sodium alcoholate, has already been mentioned. Cross-linking takes place quantitatively, and at room temperature in many cases. The cross-linking reaction is an addition reaction: no by-products are produced by the reaction.

The number of alcoholic hydroxy groups in the copolymer may be in excess of the number of azlactone groups. Thus the cross-linked copolymer may still contain free hydroxy groups which provide an improved adherence to the substrate coated with the copolymer. In addition to the cross-linking by the hydroxy groups of the copolymer a cross-linking by an external cross-linking agent can be achieved by adding a bifunctional azlactone reactive compound such as butanediol, ethylene diamine or polypropylene diamine to the polymer solution.

Suitable monomers (C) to be copolymerized with these azlactones and hydroxy compounds are vinyl and vinylidene compounds such as acrylic or methacrylic acid; maleic, fumaric, or itaconic acid or the monoalkylesters of these acids; acrylonitrile; methacrylonitrile; acrylamide; methacrylamide and the N-substitution products of these amides; styrene and its homologs such as vinyl toluene or α-methyl styrene; vinyl esters; vinyl ethers such as vinyl ethyl ether, vinyl butyl ether, or vinyl t-butyl ether; esters of acrylic, methacrylic, maleic, fumaric, or itaconic acid with alkanols having up to 18 carbon atoms in the alkyl group, said alkyl group optionally being substituted with tert. amino or alkoxy groups, e.g. dimethylaminoethyl methacrylate, β-(1-imidazolinyl)-ethyl methacrylate, ethoxyethyl acrylate.

The copolymers according to the invention can be used as adhesives, or—optionally together with fillers—as patching materials. A direct cross-linking of the azlactone polymers with reactive groups of a substrate, for example with the hydroxy groups of cellulose or of a polyester, can be brought about if an amount of hydroxy component (B) of the copolymer insufficient for complete reaction with all azlactone groups is employed.

The copolymers of the invention are especially useful as coating materials by applying a solution or dispersion thereof to a substrate to be coated and cross-linking them in situ, suitably after addition of a catalyst promoting cross-linking, e.g. either an inorganic or organic acid such as phosphoric acid or p-toluene sulfonic acid or a base such as a sodium alcoholate.

To prepare coatings, the copolymers of the invention are dispersed, that is dissolved or suspended, in a volatile organic liquid such as an ester, hydrocarbon, ether, or ketone. This material is then applied to a substrate by brushing, spraying, dipping, or other usual techniques.

The new coating materials are superior to previously known products in a variety of useful properties. Products which are extraordinarily stable toward hydrolysis, temperature, and the influence of weathering are produced on cross-linking.

A better understanding of the present invention and of its many advantages will be had by referring to the following specific examples, given by way of illustration. In the examples, all parts are by weight.

EXAMPLE 1

A mixture of 50 parts of n-butyl acrylate, 25 parts of methyl methacrylate, 6 parts of β(imidazolinyl-1)-ethyl methacrylate, 7 parts of 2-isopropenyl-4,4-dimethyl-oxazolone, 12 parts of β-hydroxyethyl acrylate, 1.2 parts by weight of dilauryl peroxide, and 100 parts of butyl acetate was divided into two equal portions. Half of the mixture was warmed to about 70° C. in a reaction vessel with stirring. After the onset of polymerization, the mixture was held at about 70° C.–80° C. while the remaining half of the mixture was run in. One hour after addition was completed, a further 0.2 part of the dilauryl peroxide initiator was added. The solution was warmed at 70° C.–80° C. for another four to five hours.

Insoluble films were obtained from the solution after the addition of 0.1 part of phosphoric acid.

EXAMPLE 2

A mixture of 55 parts of n-butyl methacrylate, 10 parts of N-methyl methacrylamid, 10 parts of 2-vinyl-4-methyl-4-ethyl oxazolone, and 25 parts by weight of N-($\beta$-hydroxyethyl)-methacrylamide was polymerized as in Example 1 in the presence of 1.5 parts of azo bis(isobutyronitrile) in 60 parts of methyl isobutylketone and 40 parts of butyl acetate.

Insoluble films were formed by the solution after the addition of 0.2 part of p-toluene sulfonic acid.

EXAMPLE 3

A mixture of 27 parts of cyclohexyl methacrylate, 33 parts of n-hexyl acrylate, 12 parts of styrene, 8 parts of acrylonitrile, 8 parts of 2-(2'-N-methacrylamido)-isopropyl-4,4-diethyloxazolone, and 12 parts of 2,3-dihydroxy propylacrylate was polymerized as in Example 1 with 1.5 parts of dilauryl peroxide in 35 parts of toluene and 65 parts of butyl acetate.

After the addition of 0.3 part of pivalic acid, insoluble films could be formed from the solution.

EXAMPLE 4

A mixture of 45 parts of benzyl acrylate, 7 parts of $\beta$-dimethylamino-ethyl methacrylate, 10 parts of dimethyl fumarate, 12 parts of tetrahydropyran-4-spiro-4'-(2'-vinyloxazolone), and 26 parts of butane diol monoacrylate was polymerized as in Example 1 with 1.6 parts of azo bis(isobutyronitrile) in 70 parts of butyl acetate and 30 parts of xylene.

After the addition of 1 part of a 30 percent solution of sodium methylate in methanol, insoluble films were obtained.

EXAMPLE 5

In a reaction vessel, a mixture of 100 parts by weight (p.b.w.) of butyl acetate and 0.5 p.b.w. of tert. butyl peroctoate is heated to 90° C. Within 4 hours a mixture of 10 p.b.w. of 2-acryloxyethyl-4-methyl-4-cyclohexyl-oxazolone-5, 15 p.b.w. 1,6-hexanediol monoacrylate, 75 p.b.w. methyl acrylate, and 1 p.b.w. tert. butyl peroctoate is added at 90° C. at a steady rate. Then, a further 0.5 p.b.w. tert. butyl peroctoate is added and the temperature is kept at 90° C. for further 5 hours. After cooling to room temperature, a clear viscous solution of 50 percent solids content with good film-forming properties is obtained. The viscosity measured by the method of Brookfield is 1500 cp. The intrinsic viscosity (measured in chloroform at 20° C.) is 0.3.

Adding 0.5 p.b.w. of p-toluene sulfonic acid, applying to a substrate of iron, and evaporating the solvent results in the formation of a cross-linked, tightly adhering film, insoluble in all common organic solvents.

EXAMPLES 6–14

Into a reaction vessel, if necessary a pressure vessel, are introduced 100 parts by weight (p.b.w.) of butyl acrylate and 0.5 p.b.w. of tert. butyl peroctoate and the mixture is heated to 90° C. A mixture consisting of 10 p.b.w. of 2-isopropenyl-4,4-dimethyloxazolone-5, 15 p.b.w. of compound I, listed below, containing a free hydroxy group, 75 p.b.w. of a monomer mixture II, listed below, and 1 p.b.w. of tert. butyl peroctoate is slowly added within 4 hours. At the end of this time another 0.5 p.b.w. of tert. butyl peroctoated is added and the reaction mixture is kept at 90° C. for another 5 hours.

TABLE

| Example | Compound I | Monomer Mixture II Compound | Weight ratio |
|---|---|---|---|
| 6 | Diglycol monomethacrylate. | Vinyl chloride, vinylidene chloride. | 30:45 |
| 7 | Hexanediol monomethacrylate. | Styrene, butyl methacrylate, methacrylic acid esters of $C_{12}$-$C_{18}$- alkanols. | 30:30:15 |
| 8 | Butanediol monoacrylate. | Methyl methacrylate, vinylidene chloride. | 30:45 |
| 9 | Di-(propyleneglycol)-itaconate. | Vinylpyrrolidone vinyl ethyl ether. | 35:40 |
| 10 | Di-(polyoxypropylene)-itaconate of mol. weight 500 to 1,000. | Styrene, butadiene. | 40:35 |
| 11 | 4-hydroxymethyl-styrene. | 2-methyl styrene, vinyl butyl ether. | 35:40 |
| 12 | 4(2-hydroxy-ethoxy-methyl)-styrene. | Vinyl tert.-butyl ether, vinyl ethyl ether. | 30:45 |
| 13 | N-(2-hydroxy-ethyl)-methacrylamide. | Maleic acid, acrylamide, ethyl acrylate. | 5:15:55 |
| 14 | Pentaerythritol monomethacrylate. | Acrylic acid, methyl acrylate, ethylene. | 5:40:30 |

The resulting copolymer solutions are clear and viscous and have good film forming properties. After addition of 1 p.b.w. of phosphoric acid the solutions have a pot life time of several hours at room temperature. Films formed from the solutions on substrates such as wood or paper board become insoluble in all common solvents when evaporated to dryness and heated to 80° C. for 20 minutes.

What is claimed is:

1. A solvent-soluble, film-forming, solid azlactone copolymer capable of cross-linking in the absence of an external cross-linking agent, said copolymer consisting essentially of (A) 0.5 to 30 percent of an azlactone of the formula

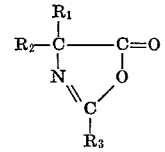

wherein $R_1$ and $R_2$ taken alone are alkyl or cycloalkyl but at least one of $R_1$ and $R_2$ is alkyl, or wherein $R_1$ and $R_2$ taken together with the carbon atom to which they are joined form a carbocyclic ring, and $R_3$ is vinyl, isopropenyl, acryloxyalkyl, methacryloxyalkyl, acrylamidoalkyl, or methacrylamidoalkyl; (B) 0.5 to 49.5 percent of a polymerizable vinylidene compound having at least one free alcoholic hydroxy group, and (C) 20.5 to 99 percent of one or more distinct olefinically unsaturated monomers copolymerizable with and distinct from (A) and (B), all percentages being by weight of all copolymerized monomers.

2. A copolymer as in claim 1 wherein said azlactone has a 4,4-dimethyl substituent.

3. A copolymer as in claim 1 wherein component (C) comprises less than 50 percent, by weight of all copolymerized monomers, of esters of acrylic or methacrylic acid esters.

4. A copolymer as in claim 1 wherein component (C) comprises two or more distinct olefinically unsaturated monomers copolymerizable with and distinct from (A) and (B).

5. A copolymer as in claim 1 dispersed in a volatile organic liquid.

6. A copolymer as in claim 4 dispersed in a volatile organic liquid.

7. A copolymer as in claim 1 wherein component (C) comprises one or more distinct monomers selected from the group consisting of: acrylic acid; methacrylic acid; maleic, fumaric, or itaconic acid; acrylonitrile– methacrylonitrile; acrylamide, methacrylamide, and N-substitution products of these amides; styrene; vinyl toluene; α-methyl styrene; vinyl esters; vinyl ethers; esters of acrylic, methacrylic, maleic, fumaric, or itaconic acid with alkanols having up to 18 carbon atoms in the alkyl group, and such esters wherein said alkyl group is substituted with a tertiary amino group or an alkoxy group.

8. A copolymer as in claim 1 wherein component (C) comprises two or more distinct monomers selected from the group consisting of: acrylic acid; methacrylic acid; maleic, fumaric, or itaconic acid; acrylonitrile; methacrylonitrile; acrylamide, methacrylamide, and N-substitution products of these amides; styrene; vinyl toluene; α-methyl styrene; vinyl esters; vinyl ethers; esters of acrylic, methacrylic, maleic, fumaric, or itaconic acid with alkanols having up to 18 carbon atoms in the alkyl group, and such esters wherein said alkyl group is substituted with a tertiary amino group or an alkoxy group.

9. The method of making the solvent-soluble, film-forming, solid azlactone copolymer of claim 1 which comprises copolymerizing (A) 0.5 to 30 percent of an azlactone of the formula

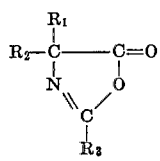

wherein $R_1$ and $R_2$ taken alone are alkyl or cycloalkyl but at least one of $R_1$ and $R_2$ is alkyl, or wherein $R_1$ and $R_2$ taken together with the carbon atom to which they are joined form a carbocyclic ring, and $R_3$ is vinyl, isopropenyl, acryloxyalkyl, methacryloxyalkyl, acrylamidoalkyl, or methacrylamidoalkyl; (B) 0.5 to 49.5 percent of a polymerizable vinylidene compound having at least one free alcoholic hydroxy group, and (C) 20.5 to 99 percent of one or more distinct olefinically unsaturated monomers copolymerizable with and distinct from (A) and (B), all percentages being by weight of all copolymerized monomers.

10. The method as in claim 9 wherein component (C) comprises one or more distinct monomers selected from the group consisting of: acrylic acid; methacrylic acid; maleic, fumaric, or itaconic acid; acrylonitrile; methacrylonitrile; acrylamide, methacrylamide, and N-substitution products of these amides; styrene; vinyl toluene; α-methyl styrene; vinyl esters; vinyl ethers; esters of acrylic, methacrylic, maleic, fumaric, or itaconic acid with alkanols having up to 18 carbon atoms in the alkyl group, and such esters wherein said alkyl group is substituted with a tertiary amino group or an alkoxy group.

11. The method as in claim 14 wherein component (C) comprises two or more distinct monomers selected from the group consisting of: acrylic acid; methacrylic acid; maleic, fumaric, or itaconic acid; acrylonitrile; methacrylonitrile; acrylamide, methacrylamide, and N-substitution products of these amides; styrene; vinyl toluene; α-methyl styrene; vinyl esters; vinyl ethers; esters of acrylic, methacrylic, maleic, fumaric, or itaconic acid with alkanols having up to 18 carbon atoms in the alkyl group, and such esters wherein said alkyl group is substituted with a tertiary amino group or an alkoxy group.

12. The method as in claim 9 wherein the copolymerization reaction is performed in the presence of a volatile organic liquid.

13. The method as in claim 9 wherein component (C) comprises less than 50 percent, by weight of all monomers to be copolymerized, of esters of acrylic or methacrylic acid esters.

14. The method as in claim 9 wherein component (C) comprises two or more distinct olefinically unsaturated monomers copolymerizable with and distinct from (A) and (B).

15. The method of forming a cross-linked product from the copolymer of claim 1 which comprises maintaining said copolymer at a temperature from about 15° C. to about 80° C. until cross-linking occurs.

16. The method of claim 15 wherein said cross-linking is accelerated by the presence of an acid or base to catalyze the cross-linking.

References Cited

UNITED STATES PATENTS 3,355,518    11/1967    Sullivan et al. _____ 260—78
3,488,327    1/1970    Kollinsky et al. _____ 260—78.3

OTHER REFERENCES

Iwakura et al.: Journal of Polymer Science, Part A-1, vol. 4, October 1966, pp. 2649–2657 (copy in parent case) S.N. 779,651.

JAMES A. SEIDLECK, Primary Examiner

J. KIGHT III, Assistant Examiner

U.S. Cl. X.R.

260—31.2, 32.8, 33.2, 33.6, 78.5, 80.72, 80.75